Figure 1:
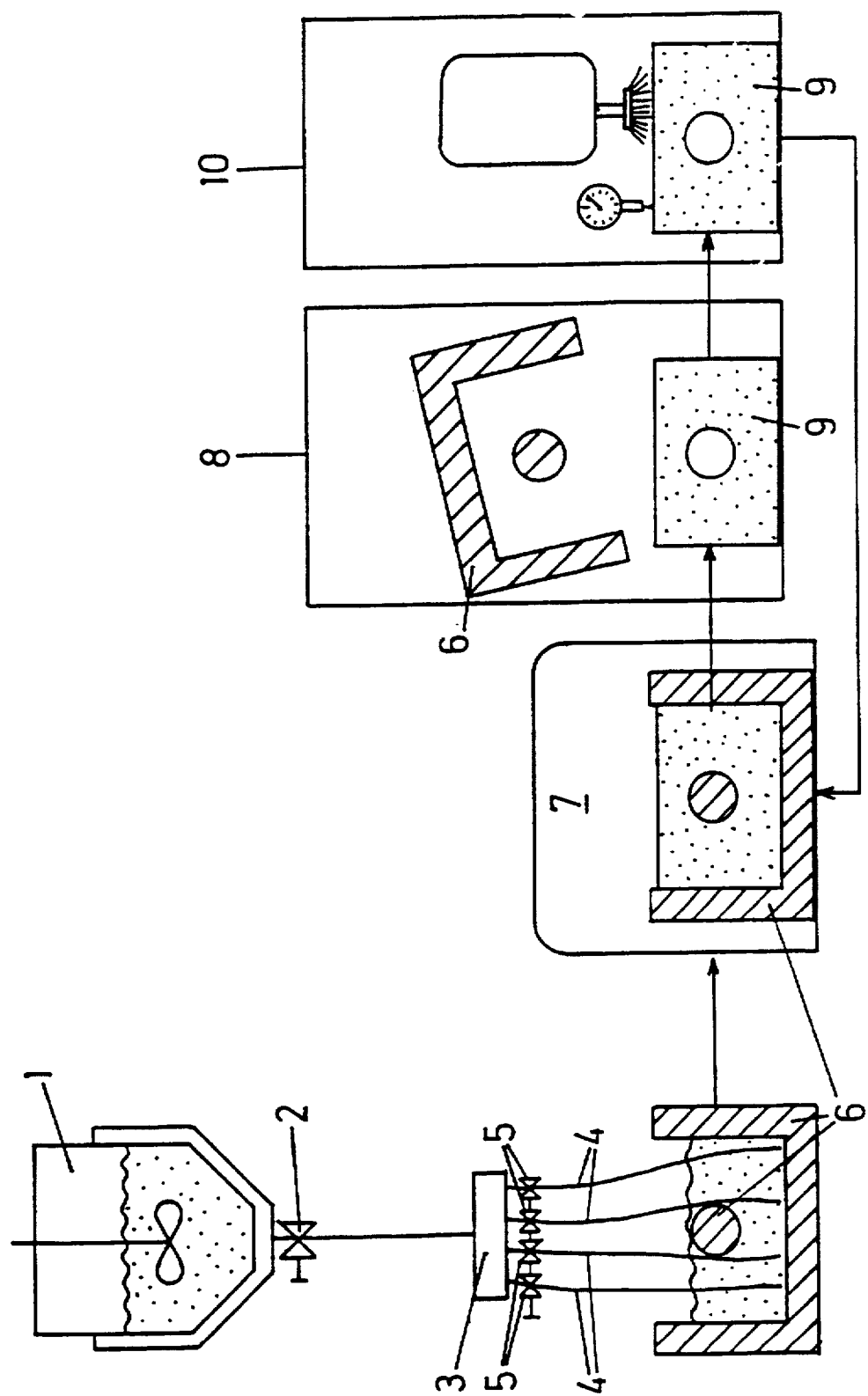

United States Patent

Düchting et al.

[11] Patent Number: 5,795,514
[45] Date of Patent: Aug. 18, 1998

[54] PROCESS FOR PRODUCING MACHINE COMPONENTS FROM CAST MINERAL

[75] Inventors: Wolfgang Düchting, Witten; Horst Gunter Noack, Reeken, both of Germany

[73] Assignee: Düchting Pumpen Maschinenfabrik GmbH & Co. KG, Witten, Germany

[21] Appl. No.: 676,126

[22] PCT Filed: Dec. 20, 1994

[86] PCT No.: PCT/EP94/04243

§ 371 Date: Oct. 18, 1996

§ 102(e) Date: Oct. 18, 1996

[87] PCT Pub. No.: WO95/17297

PCT Pub. Date: Jun. 29, 1995

[30] Foreign Application Priority Data

Dec. 20, 1993 [DE] Germany .................. 43 43 547.5

[51] Int. Cl.⁶ .................................................. B29C 39/42
[52] U.S. Cl. .................. 264/71; 264/102; 264/109; 264/112
[58] Field of Search .................. 264/109, 112, 264/71, 101, 102

[56] References Cited

U.S. PATENT DOCUMENTS 3,644,608  2/1972  Valentine ........................ 264/71
5,492,661  2/1996  Weddigen et al. ............... 264/109

FOREIGN PATENT DOCUMENTS

| 054276 | 6/1982 | European Pat. Off. |
| 118073 | 9/1984 | European Pat. Off. |
| 316541 | 5/1989 | European Pat. Off. |
| 4012044 | 10/1991 | Germany. |
| 4206603 | 9/1993 | Germany. |
| 2006359 | 3/1990 | Japan. |
| 2237578 | 5/1991 | United Kingdom. |
| WO85/05069 | 11/1985 | WIPO. |

*Primary Examiner*—Mary Lynn Theisen
*Attorney, Agent, or Firm*—Collard & Roe, P.C.

[57] ABSTRACT

A process is for producing machine components from highly corrosion and water-resistant cast mineral, especially for the production of monolithically cast pump housings or parts in which the binder is first mixed with the filler in a positive mixer and the finished mixture is poured into a mould and hardened. In order to obtain a dense and non-porous casting which needs no further machining, a heat-curing synthetic resin-curing agent system is used as the binder. The binder and filler are mixed in a heatable, evacuated positive mixer at a temperature of over 20° C. and a pressure of under 80 mbar. The casting take place in a preheated mould as a rising casting. The cast mineral in the mould is first cured at a temperature of over 60° C. and the cured casting is removed from the mould, cleaned, measured and if necessary post machined. Finally the casting is cured in an annealing furnace at over 120° C.

9 Claims, 1 Drawing Sheet

PROCESS FOR PRODUCING MACHINE COMPONENTS FROM CAST MINERAL

The invention relates to a process for producing machine components from highly corrosion- and wear-resistant cast mineral especially for the manufacture of monolithically cast pump housing or pump parts, in which process the vehicle is first mixed with the filler in a positive mixer and the finished mixture is poured into a mold and cured.

Such a process is known, for example from DE-A-42 06 603. Cast mineral for pump parts is understood to be, for example a mixture of chemically stable and temperature-resistant reaction resin with suitable fillers such as, for example silicon carbide, quartz sand, glass, ceramics etc. For enhancing the resistance to chemicals and the resistance to wear of such pump parts, the mixture contains as much filler as possible and as little reaction resin as possible. By adjusting a favorable grain distribution, such a highly filled cast mineral contains, for example 10 to 40% by weight reaction resin and 60 to 90% by weight filler. A special problem in the manufacture of, for example pump housings or pump pistons for rotary pumps from such cast mineral is the relatively low tensile strength of said material. Such excessively low tensile strength is substantially caused by the fact that the reaction resin used as the vehicle fails to combine with the filler particles with adequate strength. The poor embedding and fixing of the filler particles also has the consequence that filler particles become detached from the composite on highly stressed surfaces, which leads to undesirable erosions on the surfaces in spite of the high resistance of the filler particles to wear.

In the manufacture of pump housings from cast mineral, it has already been attempted to compensate the lack of tensile strength of the material by a multi-shell structure, and by intermediate layers of, if need be, prestressed reinforcements. However, such a multi-shell structure, as compared to the single-piece, monolithic cast piece, leads to unacceptably high manufacturing costs due to the successive casting of the individual shells.

Another problem in the manufacture of thick-walled machine components from highly filled cast mineral is the poor machinability of the finished blank. It is consequently extremely difficult to carry out, if need be, remachining work on the finished blank.

The problem of the invention is to further develop the process of the type specified above in a way such that the manufactured monolithic cast piece is provided with a superior tensile strength and a superior inner coherence, and that it can be reworked in a simple way, if necessary.

For solving said problem, the invention proposes on the basis of the process specified above that a hot-curing synthetic resin/hardener system is used as the vehicle;

the vehicle and the filler are mixed in a heatable, evacuated positive mixer at a temperature of higher than 20° C. and at a pressure of under 80 mbar, particularly under 20 mbar;

casting is carried out in a preheated casting mold as a rising cast;

the cast mineral present in the casting mold is first slightly cured at a temperature of higher than 60° C., and the slightly cured casting is removed from the mold;

the slightly cured casting is cleaned, measured and mechanically reworked, if need be; and the casting is finally completely cured in an annealing furnace at over 120° C.

The process according to the invention has the special advantage that the mixture is completely degasefied before it is poured into the casting mold. In this way, especially the air unavoidably introduced together with the filler is completely removed from the mixture. Like the air, all gases forming during the mixing the synthetic resin-hardener system, and the residual moisture are safely removed from the mixture. As no air inclusions at all can get into the mixture even with rising casting, the casting overall is provided with a structure that is free of bubbles and pore the highest possible degree. Due to the fact that in the process according to the invention, all intermediate spaces between the filler particles are completely filled with vehicle, the resulting casting has distinctly superior strength properties as compared to the state of the art, and, moreover, it is significantly more resistant to erosion.

By using a hot-curing synthetic resin-hardener system, it is possible in the process according to the invention to influence the curing process in a controlled way, i.e., the keep the mixture liquid during the mixing and casting steps for a sufficient duration, and to cure the casting through controlled heating of the mold. With a hot-curing resin, it is possible also in the plant to bridge even long operating pauses—e.g. over the weekend—without the synthetic resin-hardener system becoming solid at the wrong time. For said reason, the plant needs not to be operated idle even with longer operating pauses, and not to be cleaned with solvents. In connection with the process of the invention, this results in a particularly low load on the environment.

Due to the stepped curing of the castings as proposed according to the invention, it is possible to carry out cleaning and mechanical reworking, if needed, on the not-yet completely cured casting, which simplifies such work significantly. Following the final complete curing of the casting, one obtains a clean, pore-free, finished casting with absolute dimensional stability, which can be used further immediately.

In order to enhance the mold filling behavior with rising casting, a useful further development of the invention proposes that the casting mold is put into vibration during the casting step.

For a trouble-free transfer of the finished mixture from the positive mixer into the casting mold, a pressure gradient is usefully adjusted during the casting step between the positive mixer and the casting mold, such gradient supporting the casting process.

For example, the casting step can be carried out in a casting mold that is under vacuum. In this case, the positive mixer is adjusted to atmospheric pressure during the casting process, so that the latter is supported by the vacuum prevailing in the casting mold.

Alternatively, the casting process can be carried out also in a casting mold adjusted to atmospheric pressure. In this case, the mixture is usefully forced out of the positive mixer from the top down with compressed air.

If need be, the casting step can be carried out in the casting also also in a rising way against a yielding cushion of compressed air.

In order to obtain savings, if necessary, in connection with the relatively expensive casting compound, lost kernels may be arranged in the casting mold, if need be, which are cast into the casting.

Likewise, for the purpose of reinforcement or for the later connection of other machine components, cast-in parts may be arranged in the casting mold, which are incorporated in the casting.

An exemplified implementation of the invention is explained in greater detail in the following by reference to the drawing, in which the sequence of the process of the invention is shown schematically.

First, a hot-curing synthetic resin-hardener system is loaded in a hermetically sealable positive mixer 1, which is heatable and/or coolable. Subsequently, the positive mixer 1 is vented and adjusted to a vacuum of under 80 mbar, preferably of under 20 mbar. The synthetic resin-hardener system is intensively mixed at a mixing temperature of over 20° C. under vacuum, whereby any escaping reaction gases and residual moisture are withdrawn at the same time. Thereafter, the filler is admitted into the positive mixer. Subsequently, the vehicle and the filler are mixed in the positive mixer 1, again under a vacuum of less than 80 mbar, preferably 20 mbar. By the vacuum prevailing and maintained during the mixing process, the entire air introduced by the filler and the residual moisture are separated. By controlled heating or cooling, the mixture is adjusted to the temperature optimal for the casting process, which is a temperature of over 20° C.

In the subsequent casting process, the finished mixture is transferred from the underside of the positive mixer 1 via a valve 2 into a distributor 3, in which the mixture is distributed to a number of hoses 4, which each can be shut off individually by the shutoff elements 5. The hoses 4 feed into the lower zone of a preheated, heatable casting mold 6, in a way such that the filled-in mixture rises in the mold from the bottom upwardly. The casting mold 6 is connected with a vibrator and, if necessary, has a sealable top with a vacuum connection.

After the casting mold 6 has been filled via the hoses 4, it is transported into a furnace 7, in which the mold with its content is heated to over 60°, i.e., to a temperature at which the mixture is cured slightly, but not yet completely.

Subsequently, the mold 6 is removed in a mold removal station 8. The slightly cured casting 9 is subsequently cleaned in a cleaning and reworking station 10, measured, and reworked, if necessary. Thereafter, the casting 9 is transferred back into the furnace 7 and completely cured there at a temperature of over 120° C.

The casting process explained above is supported in that a pressure gradient is adjusted between the positive mixer 1 and the casting mold 6. This can be accomplished, for example by adjusting in the casting mold 6 a higher vacuum than in the positive mixer 1. Alternatively the casting mold 6 may be under atmospheric pressure, whereas the positive mixer 1 is adjusted to a higher pressure by a cushion of compressed air applied from the top. If necessary, rising casting in the casting mold 6 may take place under excess pressure as well against a yielding cushion of compressed air. Important is only that no air is permitted to get into the mixture as the latter is being transported from the positive mixer 1 into the casting mold 6.

We claim:

1. Process for producing machine components from highly corrosion- and wear-resistant cast mineral, in which the vehicle is first mixed with the filler in a positive mixer and the finished mixture is poured into a casting mold and then cured, comprising a hot-curing synthetic resin-hardener system is used as the vehicle;

mixing of the vehicle and the filler is carried out in a heatable, evacuated positive mixer (1) at a temperature of over 20° C. and at a pressure of under 80 mbar;

casting is carried out in a preheated casting mold (6) as a rising casting;

the cast mineral present in the casting mold (6) is first slightly cured at a temperature of over 60° C., and the slightly cured casting (9) is removed from the mold;

the slightly cured casting (9) is cleaned, measured and reworked, if necessary; and the casting (9) is finally completely cured in an annealing furnace (7) at over 120° C.

2. Process according to claim 1, wherein the casting mold (6) is put into vibration during the casting process.

3. Process according to claim 1, wherein during the casting process, a pressure gradient supporting the casting process is adjusted between the positive mixer (1) and the casting mold (6).

4. Process according to claim 3, characterized in that the casting process is carried out in a casting mold (6) under vacuum.

5. Process according to claim 3, wherein the casting process takes place in the casting mold (6) adjusted to atmospheric pressure.

6. Process according to claim 5, wherein the casting process takes place in the casting mold (6) against a compressed-air cushion adjusted to excess pressure.

7. Process according to claim 1, wherein lost kernels are arranged in the casting mold (6), said kernels being incorporated by casting in the casting (9).

8. Process according to claim 1, wherein cast-in parts are arranged in the casting mold (6), said parts being incorporated by casting in the casting (9).

9. Process according to claim 1, wherein said mixing is at a pressure of under 20 mbar.

* * * * *